United States Patent
Chan

(10) Patent No.: US 11,014,662 B2
(45) Date of Patent: May 25, 2021

(54) METHOD AND SYSTEM FOR GENERATING A SET OF VALUES FOR RESPECTIVE ONES OF A SET OF PARAMETERS USED IN DETERMINING ROTOR BLADE PROFILES FOR A COAXIAL ROTOR SYSTEM

(71) Applicant: ST Engineering Aerospace Ltd., Singapore (SG)

(72) Inventor: Keen Ian Chan, Singapore (SG)

(73) Assignee: ST ENGINEERING AEROSPACE LTD., Paya Lebar (SG)

( * ) Notice: Subject to any disclaimer, the term of this patent is extended or adjusted under 35 U.S.C. 154(b) by 484 days.

(21) Appl. No.: 16/060,374

(22) PCT Filed: Dec. 9, 2015

(86) PCT No.: PCT/SG2015/050489
§ 371 (c)(1),
(2) Date: Jun. 7, 2018

(87) PCT Pub. No.: WO2017/099665
PCT Pub. Date: Jun. 15, 2017

(65) Prior Publication Data
US 2019/0002096 A1    Jan. 3, 2019

(51) Int. Cl.
*B64C 27/473* (2006.01)
*B64C 27/10* (2006.01)
*B64C 27/467* (2006.01)

(52) U.S. Cl.
CPC ............ *B64C 27/473* (2013.01); *B64C 27/10* (2013.01); *B64C 27/467* (2013.01)

(58) Field of Classification Search
None
See application file for complete search history.

(56) References Cited

U.S. PATENT DOCUMENTS

| 4,730,795 A | 3/1988 | David |
| 10,112,707 B1 * | 10/2018 | Howard ................ B64C 39/024 |
| 2010/0232928 A1 | 9/2010 | Marze |
| 2018/0281949 A1 * | 10/2018 | Mitchell ................ B64C 11/48 |

OTHER PUBLICATIONS

Rand et al—Aerodynamic Optimization of Coaxial Rotor in Hover and Axial Flight (Year: 2010).*
Lucas—Study of Contra-rotating Coaxial Rotors in Hover Performance (Year: 2007).*

(Continued)

*Primary Examiner* — Juan G Flores
(74) *Attorney, Agent, or Firm* — Lewis Roca Rothgerber Christie LLP

(57) ABSTRACT

A method and system for generating a set of values for respective ones of a set of parameters used in determining rotor blade profiles for a coaxial rotor system. The method includes establishing (302) a ratio of respective desired thrusts of an upper rotor (102, 602) and a lower rotor (104, 604) of the coaxial rotor system based on a desired performance of the coaxial rotor system, and determining (304) the set of values of the set of parameters from the desired thrusts ratio based on a torque balance condition between the upper rotor and the lower rotor of the coaxial rotor system.

20 Claims, 9 Drawing Sheets

(56) References Cited

OTHER PUBLICATIONS

Leishman et al., "Figure of Merit Definition for Coaxial Rotors," *Journal of the American Helicopter Society*, 53, (3), 2008, pp. 290-300.
Rand et al., "Aerodynamic Optimization of Coaxial Rotor in Hover and Axial Flight," 27th International Congress of the Aeronautical Sciences, Nice, France, Sep. 19-24, 2010.
Syal, "Contributions to the Aerodynamic Optimization of a Coaxial Rotor System," Masters Thesis, University of Maryland, 2008.
McAlister et al., "Experimental and Numerical Study of a Model Coaxial Rotor," American Helicopter Society 62nd Annual Forum Proceedings, Phoenix, AZ, May 9-11, 2006.
Lee et al., "Parametric Study for Hovering Performance of a Coaxial Rotor Unmanned Aerial Vehicle", Journal of Aircraft, vol. 47, No. 5, Sep.-Oct. 2010.

\* cited by examiner

METHOD AND SYSTEM FOR GENERATING A SET OF VALUES FOR RESPECTIVE ONES OF A SET OF PARAMETERS USED IN DETERMINING ROTOR BLADE PROFILES FOR A COAXIAL ROTOR SYSTEM

CROSS-REFERENCE TO RELATED APPLICATION(S)

This application is a National Phase Patent Application and claims the priority of International Application Number PCT/SG2015/050489, filed on Dec. 9, 2015, the entire contents of which are incorporated herein by reference.

TECHNICAL FIELD

Embodiments relate generally to a method and system for generating a set of values for respective ones of a set of parameters used in determining rotor blade profiles for a coaxial rotor system.

BACKGROUND

Renewed interest in contra-rotating coaxial rotor systems for Vertical Take-Off and Landing (VTOL) aircraft has seen a surge in the number of studies conducted on coaxial rotor systems. Several computational models and theories have also been proposed for modeling of the coaxial rotor systems or for efficiency evaluation of the coaxial rotor systems.

However, most of these models and theories are typically for post-analysis or post-evaluation of the coaxial rotor system. In other words, configurations and/or dimensions and/or operating parameters of the coaxial rotor system must already have been available for inputting into the models and theories to conduct the analysis or evaluation of the performance of the coaxial rotor system. Accordingly, these models and theories do not allow an aircraft engineer to simply utilize and/or apply these models and theories as the basis for engineering of a coaxial rotor system from scratch so as to derive the configurations and/or dimensions and/or operating parameters of the coaxial rotor system. Thus, the conventional process for defining the configuration and/or dimensions and/or operating parameters of the coaxial rotor system may involve an iterative process in which the aircraft engineer has to arbitrarily arrive at multiple sets of configurations and/or dimensions and/or operating parameters through trial and error, and to test and analyse the efficiency and/or the performance of the coaxial rotor system for each set of configurations and/or dimensions and/or operating parameters before selecting the best for implementation.

Example embodiments provide a method and system to address some of the issues discussed above.

SUMMARY

According to various embodiments, there is provided a method of generating a set of values for respective ones of a set of parameters used in determining rotor blade profiles for a coaxial rotor system, the method including establishing a ratio of respective desired thrusts of an upper rotor and a lower rotor of the coaxial rotor system based on a desired performance or operational requirements of the coaxial rotor system, and determining the set of values of the set of parameters from the desired thrusts ratio based on a torque balance condition between the upper rotor and the lower rotor of the coaxial rotor system.

According to various embodiments, there is provided a system for generating a set of values for respective ones of a set of parameters used in determining rotor blade profiles for a coaxial rotor system, the system including means for establishing a ratio of respective desired thrusts of an upper rotor and a lower rotor of the coaxial rotor system based on a desired performance or operational requirements of the coaxial rotor system; and means for determining the set of values of the set of parameters from the desired thrusts ratio based on a torque balance condition between the upper rotor and the lower rotor of the coaxial rotor system.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DETAILED DESCRIPTION

Embodiments described below in context of the apparatus are analogously valid for the respective methods, and vice versa. Furthermore, it will be understood that the embodiments described below may be combined, for example, a part of one embodiment may be combined with a part of another embodiment.

Figure 1:
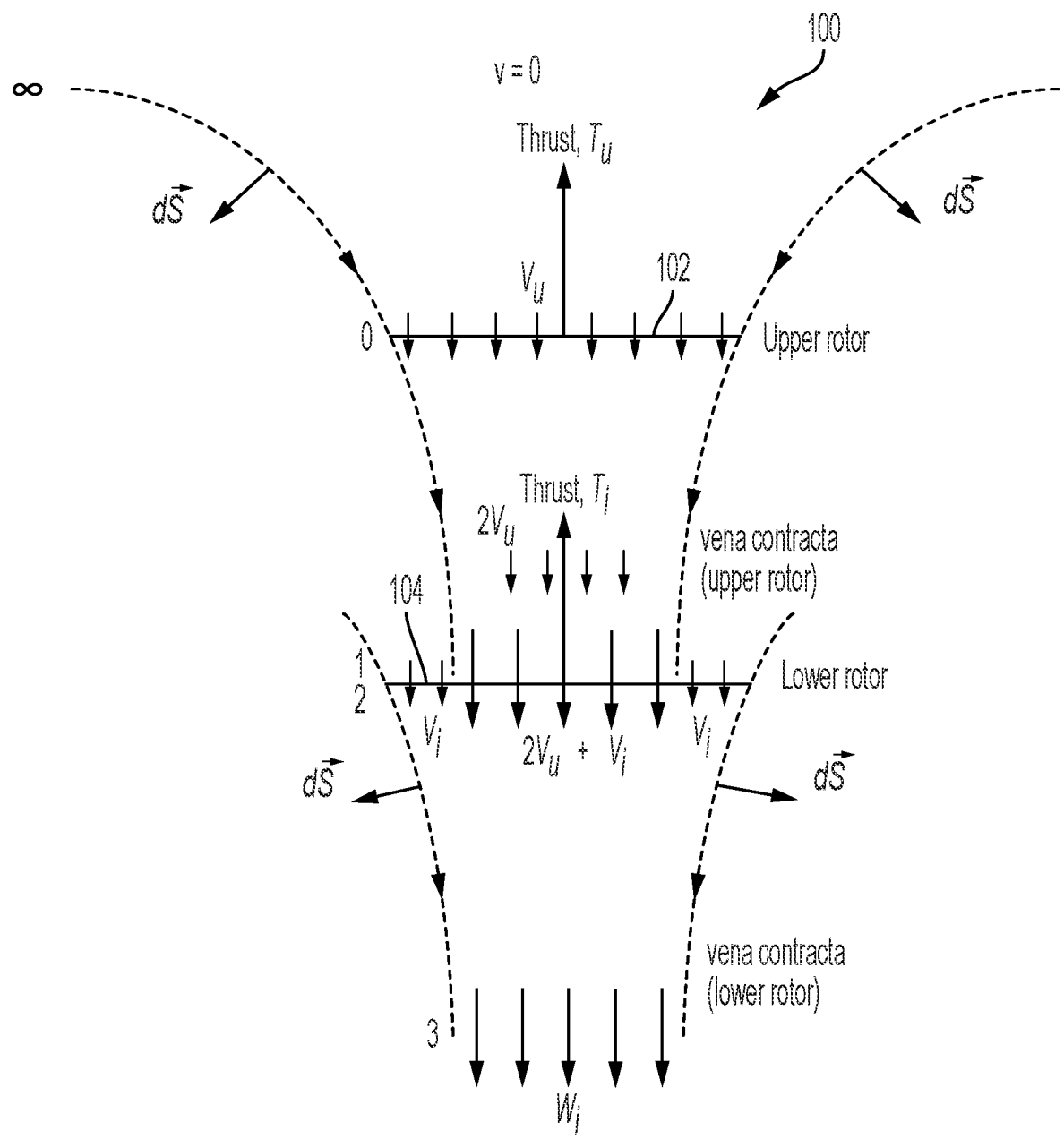
FIG. 1 shows a schematic representation of a coaxial rotor system with equal rotor diameters.

An example of an existing theory for post-analysis of the efficiency of a coaxial rotor with known configurations and/or dimensions is presented in 'Leishman, J. G. and Syal, M., "Figure of Merit Definition for Coaxial Rotors," Journal of the American Helicopter Society, 53, (3), 2008, pp. 290-300' (hereinafter referred to as "baseline momentum theory for coaxial rotor systems"). In the baseline momentum theory for coaxial rotor systems presented, the coaxial rotor system 100 was modelled as a pair of actuator discs 102, 104 with equal diameters, spaced apart from each other, as shown in FIG. 1. In other words, before the analysis of the efficiency of the coaxial rotor system is conducted, the configuration and/or dimensions of the coaxial rotor system have to be known and in which the diameters of the upper and lower rotors are equal.

By applying conservation of mass, momentum and energy, together with torque balance condition, equations were derived for induced power and the individual thrusts of the upper 102 and lower 104 rotors to analyse the efficiency of the coaxial rotor system with equal upper and lower rotor diameters. However, it has to be noted that the torque balance condition was indirectly applied in the baseline momentum theory for coaxial rotor through a power balance condition. This is because, with the assumption of equal diameters for the upper 102 and lower 104 rotors, equal rotational speeds and equal tip speeds were implied. Thus, the torque balance condition was represented by equal power for the upper 102 and lower 104 rotors in the baseline momentum theory for coaxial rotor systems.

Accordingly, the induced power of the coaxial rotor system with equal diameters rotors was derived as:

$$C_{P_i} = 1.2657 \frac{C_{T_l}^{3/2}}{\sqrt{2}} \left[ \left( \frac{C_{T_u}}{C_{T_l}} \right)^{3/2} + 1 \right] \quad (1)$$

where $C_{P_i}$=Induced power coefficient, total for the coaxial pair
$C_{T_u}$=Thrust coefficient of upper rotor
$C_{T_l}$=Thrust coefficient of lower rotor From equating the power of the upper rotor 102 to the power of the lower rotor 104 (i.e. indirect application of the torque-balanced condition for equal diameter rotors), the ratio of thrusts for the upper and lower rotors was derived as:

$$\frac{C_{T_u}}{C_{T_l}} = 1.4357 \quad (2)$$

Using the total coaxial system thrust coefficient $C_{Ttot}$ ($=C_{T_u}+C_{T_l}$), the ratio of upper rotor thrust and total thrust, and the ratio of lower rotor thrust and total thrust were derived respectively as:

$$\frac{C_{T_u}}{C_{Ttot}} = 0.5897 \quad (3)$$

$$\frac{C_{T_l}}{C_{Ttot}} = 0.4103 \quad (4)$$

It can be seen that one of the key results from the baseline momentum theory for coaxial rotor systems is that total thrust is distributed about 60%-40% among the upper and lower rotors respectively for the coaxial rotor system with equal diameters for the upper 102 and lower 104 rotors. This is a derived result from the theory. In other words, by inputting the diameters of the upper 102 and lower 104 rotors to be equal from the start, the total thrust distribution is a derived result which is consistent with the conservation laws and the torque balance condition as applied to the coaxial rotor system. As can be seen, the baseline momentum theory for coaxial rotor systems is for post-evaluation of the coaxial rotor system with known configurations and/or dimensions. In this case, it was known that the coaxial rotor system has equal diameters for the upper 102 and lower 104 rotors. Accordingly, the baseline momentum theory for coaxial rotor systems also does not allow one to work out the configurations and/or dimensions of the coaxial rotor system from a desired performance and/or efficiency and/or operational requirements for the coaxial rotor system. For example, when operational requirements give rise to the need for a certain total thrust distribution between the upper and lower rotors of the coaxial rotor system, the baseline momentum theory for coaxial rotor systems does not allow one to specify the desired thrust distribution outcome as the starting basis for determining the configurations and/or dimensions of the coaxial rotor system which would achieve the desired thrust distribution.

However, in certain operational scenarios, it may be desirable to be able to specify the desired performance and/or efficiency and/or operating parameters for the coaxial rotor system as the starting basis for determining the configurations and/or dimensions of the coaxial rotor system. For example, when operational requirements give rise to the need for a certain total thrust distribution between the upper and lower rotors of the coaxial rotor system, it may be desirable to establish and specify the ratio of the desired thrusts of the upper rotor and the lower rotor of the coaxial rotor system from the start and derive the configurations and/or dimensions and/or operating parameters of the coaxial rotor system from the ratio of the desired thrusts, rather than arbitrarily selecting different configurations and/or dimensions and/or operating parameters for the coaxial rotor system and iteratively working out the thrust distribution to find the configurations and/or dimensions and/or operating parameters that produce a thrust distribution closest to the desired thrust distribution.

Figure 2:
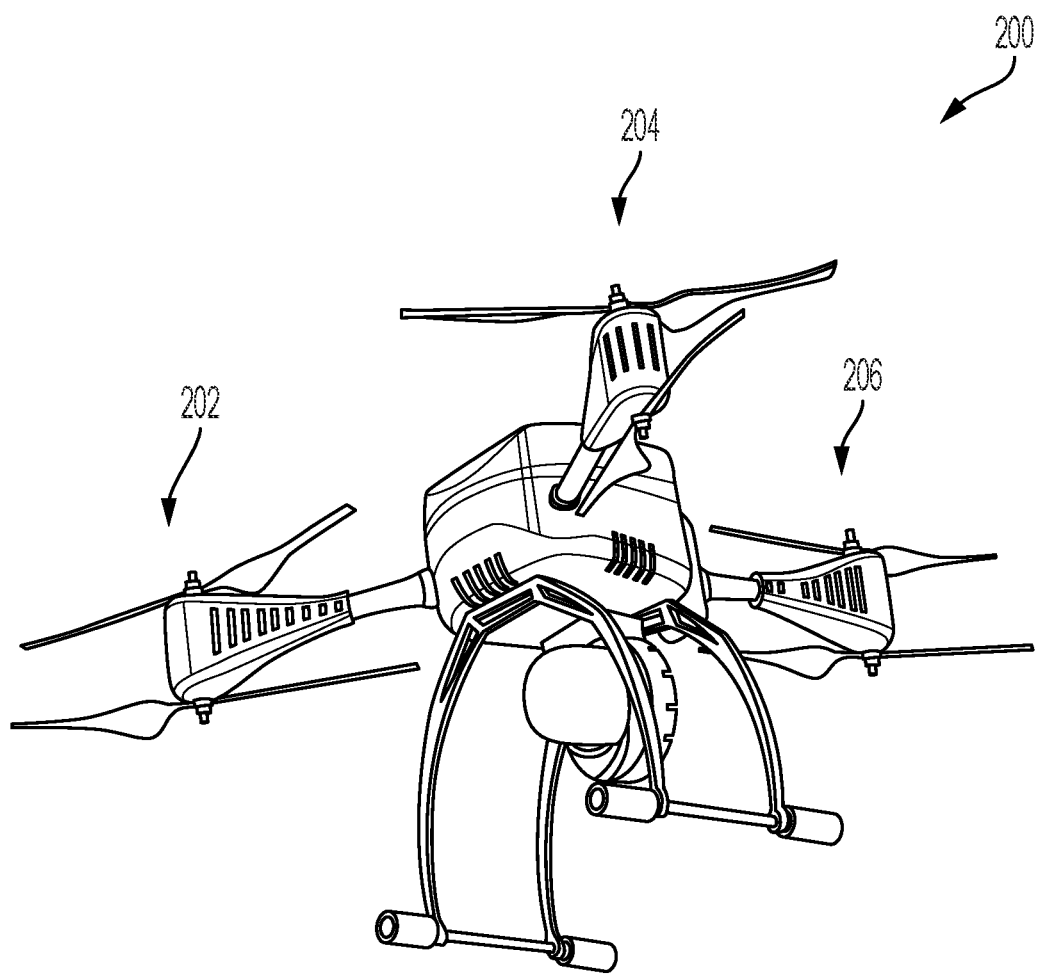
FIG. 2 shows a photograph of a multi-rotor UAV with three pairs of coaxial rotors.

For example, when coaxial rotor pairs are used in multi-rotor VTOL unmanned aerial vehicle (UAV) 200, such as shown in FIG. 2, which uses three coaxial rotor pairs 202, 204, 206, the UAV 200 is typically required to be engineered to recover from failure of one motor within a coaxial pair. For this operational scenario, it would be desirable for the thrust to be equally distributed between the upper and lower rotors, such that each rotor has the same deficit in thrust to compensate for, if the other rotor were to stop turning. Unequal distribution of thrust would mean that should the rotor producing the larger thrust fail, the other rotor would need to increase its thrust by a large amount. This may leave little thrust margin for maneuvers. In severe cases, there may be insufficient thrust available to make up for the deficit, and the aircraft will crash to the ground. Another benefit of equally distributed thrusts is that the rotors are operating under equal load condition so as to avoid the scenario in which one of the rotors may fail earlier due to unequal distribution of load when the upper and lower rotors are working at different capacity to produce different thrusts. Accordingly, it may be advantageous for each coaxial pair to be engineered for 50%-50% distribution of thrust from the start, rather than be constrained by the resultant thrusts distribution of the arbitrarily selected configurations and dimensions for the coaxial rotor system, for example the 60%-40% thrust distribution derived in the baseline momentum theory for coaxial rotor systems with equal diameter rotors.

To obtain the configurations and/or dimensions and/or operating parameters for the coaxial rotor system from desired performance and/or efficiency and/or operational requirements may be considered the initial step in engineering a coaxial rotor system. To develop the full coaxial rotor blade profiles, the configurations and/or dimensions and/or operating parameters obtained may be used as input parameters in existing models and theories, such as blade element momentum theory (BEMT) (for example as presented in 'Rand, O. and Khromov, V., "Aerodynamic Optimization of Coaxial Rotor in Hover and Axial Flight," 27$^{th}$ International Congress of the Aeronautical Sciences, Nice, France, Sep. 19-24, 2010.), to arrive at the chord distribution, twist distribution, pitch angle, etc. of the coaxial rotor blades. Accordingly, various embodiments seek to generate a set of values for the configurations and/or dimensions and/or operating parameters of the coaxial rotor system which could be used as input parameters in those models and theories to determine the rotor blade profiles for the coaxial rotor system.

According to various embodiments, there may be provided a method of generating a set of values for respective ones of a set of parameters used in determining rotor blade profiles for a coaxial rotor system. The method may include establishing a ratio of respective desired thrusts of an upper rotor and a lower rotor of the coaxial rotor system based on a desired performance and/or operational requirements of the coaxial rotor system, and determining the set of values of the set of parameters from the desired thrusts ratio based on a torque balance condition between the upper rotor and the lower rotor of the coaxial rotor system. Thus, the set of values for respective ones of the set of parameters may include configurations and/or dimensions and/or operating parameters for the coaxial rotor system. These configurations and/or dimensions and/or operating parameters may be used in determining the rotor blade profiles for the coaxial rotor system. By determining the set of values of the set of parameters from the desired thrusts ratio based only on the torque balance condition, the diameters, rotational speeds and tip speeds of the upper and lower rotors respectively become variables which may be derived as the configurations and/or dimensions and/or operating parameters for the coaxial rotor system. Advantageously, the method may allow one to start with the desired thrusts ratio of the upper rotor and the lower rotor of the coaxial rotor system to determine a set of configurations and/or dimensions and/or operating parameters which produces the desired thrusts ratio such that the configurations and/or dimensions and/or operating parameters may be used for subsequent derivation of the full rotor blade profiles.

According to various embodiments, the method may further include establishing a maximum rotor diameter for the coaxial rotor prior to the determining the set of values for the set of parameters. In certain operation scenarios, it may be necessary to limit the rotor diameter due to space constraints, portability, dimensional constraints of a storage container, detectability etc.

With the maximum rotor diameter specified from the start, the maximum rotor diameter may be used in conjunction with the desired thrust ratio in determining the set of values for the set of parameters.

According to various embodiments, the method may further include establishing a desired total thrust for the coaxial rotor prior to the determining the set of values for the set of parameters. In certain operation scenarios, it may be necessary to consider the desired total thrust in view of the payload of the aircraft as well as the structural weight of the aircraft, weight of the power source (e.g. batteries), weight limits specified by aviation authorities etc.

With the desired total thrust specified from the start, the desired total thrust may be used in conjunction with the desired thrust ratio in determining the set of values for the set of parameters.

Accordingly to various embodiments, determining the set of values for the set of parameters may further include optimizing the set of values based on a maximum hovering efficiency. Maximum hovering efficiency may be achieved by minimising the power per unit thrust. In other words, the maximum hovering efficiency may be achieved when minimal power is used to achieve the maximum thrust. With the introduction of the maximum hovering efficiency into the method, advantageously, the method may be used to derive configurations and/or dimensions and/or operating parameters of the coaxial rotor system which may be highly efficient.

According to various embodiments, the set of parameters may include a ratio of respective rotor disc areas of the upper rotor and the lower rotor of the coaxial rotor system. Advantageously, the ratio of respective rotor disc areas may be used to define a configuration of the coaxial rotor system.

According to various embodiments, the set of parameters may include the upper rotor diameter and the lower rotor diameter. Advantageously, the upper rotor diameter and the lower rotor diameter may be used to define dimensions of the coaxial rotor system.

According to various embodiments, the set of parameters may include a ratio of respective rotor tip speeds of the upper rotor and the lower rotor of the coaxial rotors. Advantageously, the ratio of respective rotor tip speeds may be used to define a configuration of the coaxial rotor system.

According to various embodiments, the set of parameters may include shaft rotational speeds of the upper rotor and the lower rotor. Advantageously, the shaft rotational speeds of the upper rotor and the lower rotor may be used to define configurations of the coaxial rotor system.

According to various embodiments, the set of parameters may include a disc loading of the upper rotor. Advantageously, the disc loading of the upper rotor may be used to define a dimension of the coaxial rotor system.

According to various embodiments, the set of parameters may include an ideal total induced power of the coaxial rotor. Advantageously, the ideal total induced power may be used to define a configuration of the coaxial rotor system.

According to various embodiments, the ratio of respective desired thrusts of an upper rotor and a lower rotor of the coaxial rotor may be 1:1. Advantageously, the coaxial rotor may have a 50%-50% distribution of thrusts between the upper rotor and the lower rotor respectively. Each rotor then has the same deficit in thrust to compensate for, if the other rotor were to stop turning. Unequal distribution of thrust would mean that should the rotor producing the larger thrust fail, the other rotor would need to increase its thrust by a large amount. This may leave little thrust margin for maneuvers. In severe cases, there may be insufficient thrust available to make up for the deficit, and the aircraft will crash to the ground. Another benefit of equally distributed thrusts is that this may allow the upper and lower rotors to operate under equal load condition such that both the upper and lower rotor will be working at similar capacity and the rate of wear for the upper and lower rotor will also be similar. This may avoid the situation in which one of the rotors may fail earlier due to unequal distribution of load when the upper and lower rotors are working at different capacity to produce different thrusts.

Figure 3:
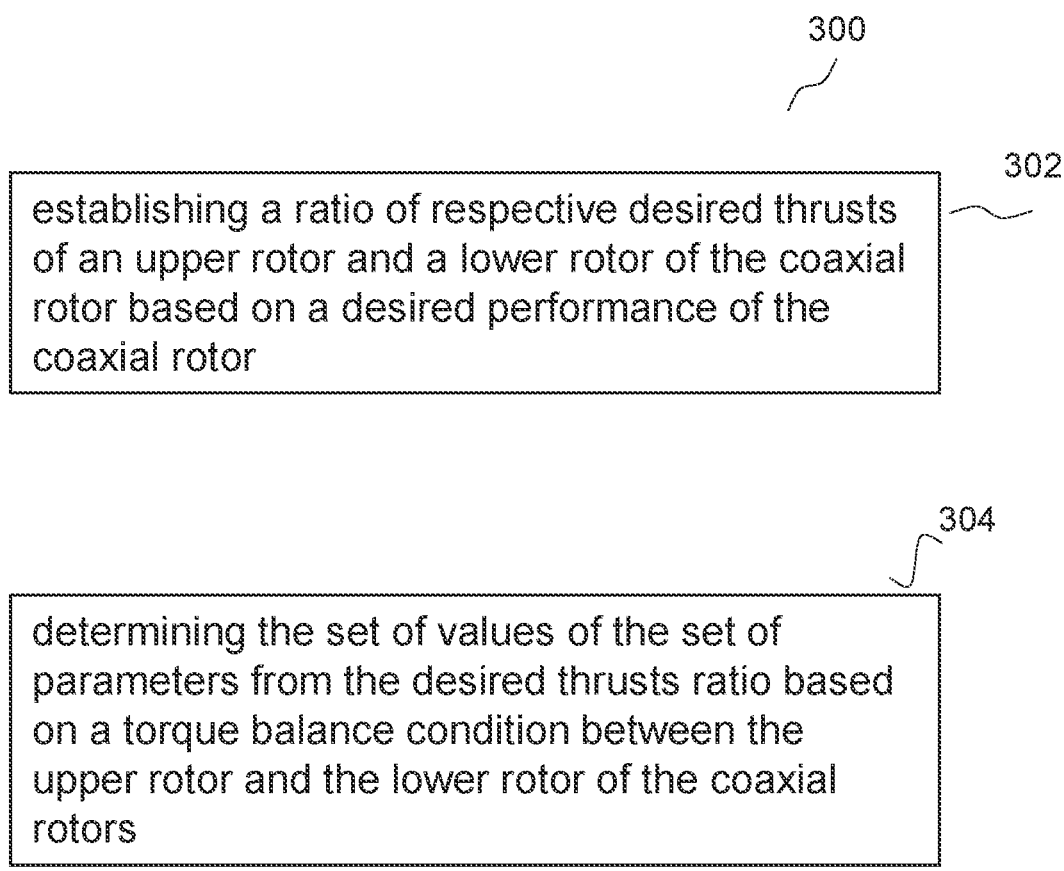
FIG. 3 shows a flow chart illustrating a method of generating a set of values for respective ones of a set of parameters used in determining rotor blade profiles for a coaxial rotor system according to various embodiments.

FIG. 3 shows a method 300 of generating a set of values for respective ones of a set of parameters used in determining rotor blade profiles for a coaxial rotor system according to various embodiments. At 302, the method includes establishing a ratio of respective desired thrusts of an upper rotor and a lower rotor of the coaxial rotor system based on a desired performance of the coaxial rotor system. At 304, the method includes determining the set of values of the set of parameters from the desired thrusts ratio based on a torque balance condition between the upper rotor and the lower rotor of the coaxial rotor system.

Figure 4:
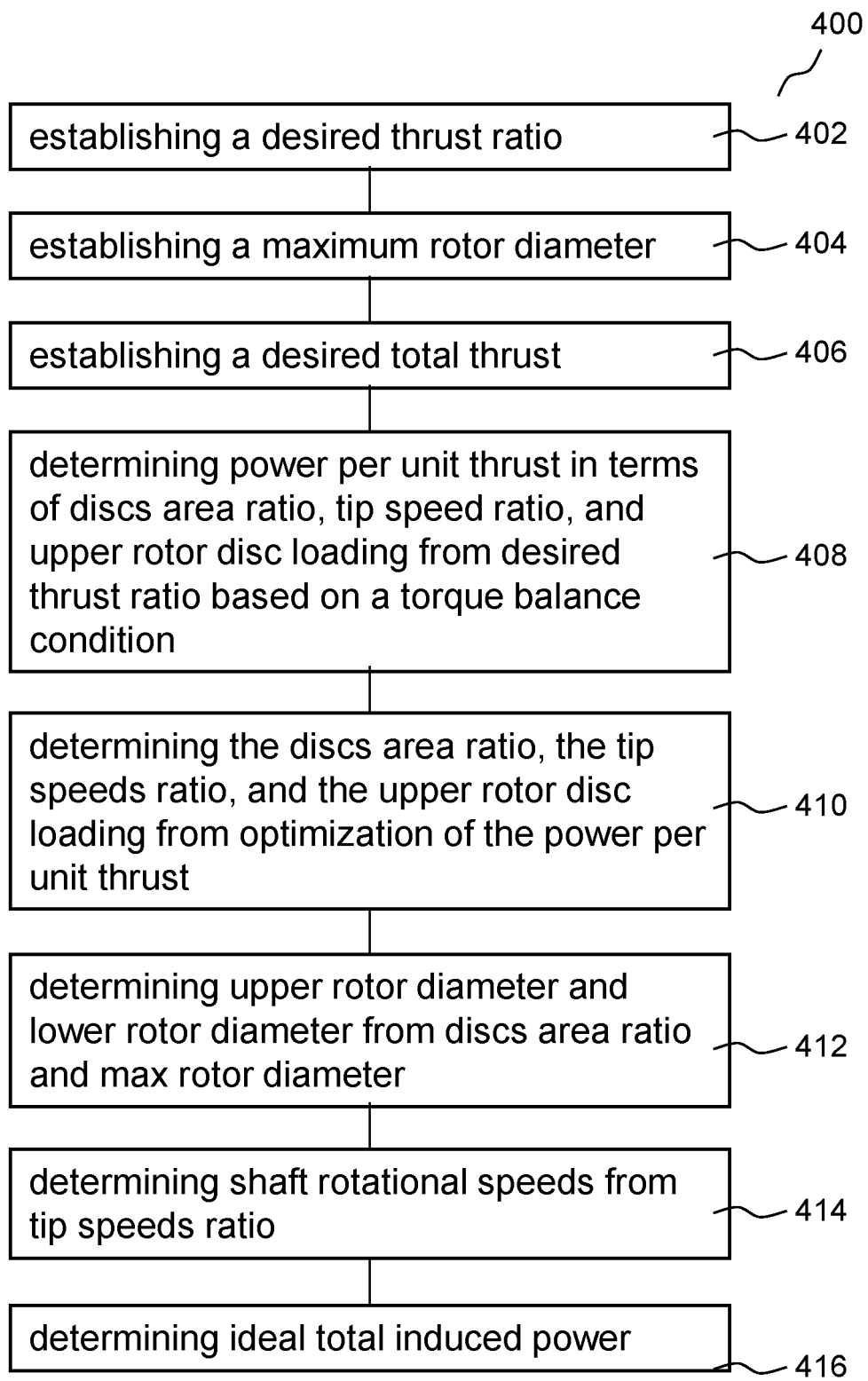
FIG. 4 shows a flow chart illustrating a method of generating a set of values for respective ones of a set of parameters used in determining rotor blade profiles for a coaxial rotor system according to various embodiments.

FIG. 4 shows a method 400 of generating a set of values for respective ones of a set of parameters used in determining rotor blade profiles for a coaxial rotor system according to various embodiments. At 402, similar to the method 300 of FIG. 3, a desired thrusts ratio of an upper rotor and a lower rotor of the coaxial rotor system may be established based on a desired performance of the coaxial rotor system. At 404, a maximum rotor diameter may be established. At 406, a desired total thrust may be established. At 408, power per unit thrust for the coaxial rotor system may be determined in terms of ratio of upper to lower rotor disc areas, ratio of upper to lower rotor tip speeds and disc loading of the upper rotor from the desired thrusts ratio based on a torque balance condition between the upper rotor and the lower rotor of the coaxial rotor system. At 410, the ratio of upper to lower rotor disc areas, the ratio of upper to lower rotor tip speeds and the disc loading of the upper rotor may be determined from optimization of the power per unit thrust. To optimize the power per unit thrust is to minimize the power per unit thrust for the coaxial rotor system which translates to maximum hovering efficiency. At 412, the upper rotor diameter and the lower rotor diameter may be determined from the ratio of upper to lower rotor disc areas and the maximum rotor diameter. At 414, the shaft rotational speeds may be determined from the ratio of upper to lower rotor tip speeds and a specified lower rotor tip speed. For example, the specified lower rotor tip speed may be specified as tip Mach number of 0.15, which is a low subsonic value that produces acceptable noise levels. This Mach number may be converted to speed by multiplying with the speed of sound, which is a constant for given ambient conditions. At 416, the ideal total induced power of the coaxial rotor system is determined by applying the desired total thrust to the power per unit thrust of the coaxial rotor system.

Details of a method of generating a set of values for respective ones of a set of parameters used in determining rotor blade profiles for a coaxial rotor system according to various embodiments are described in the following.

Figure 5:
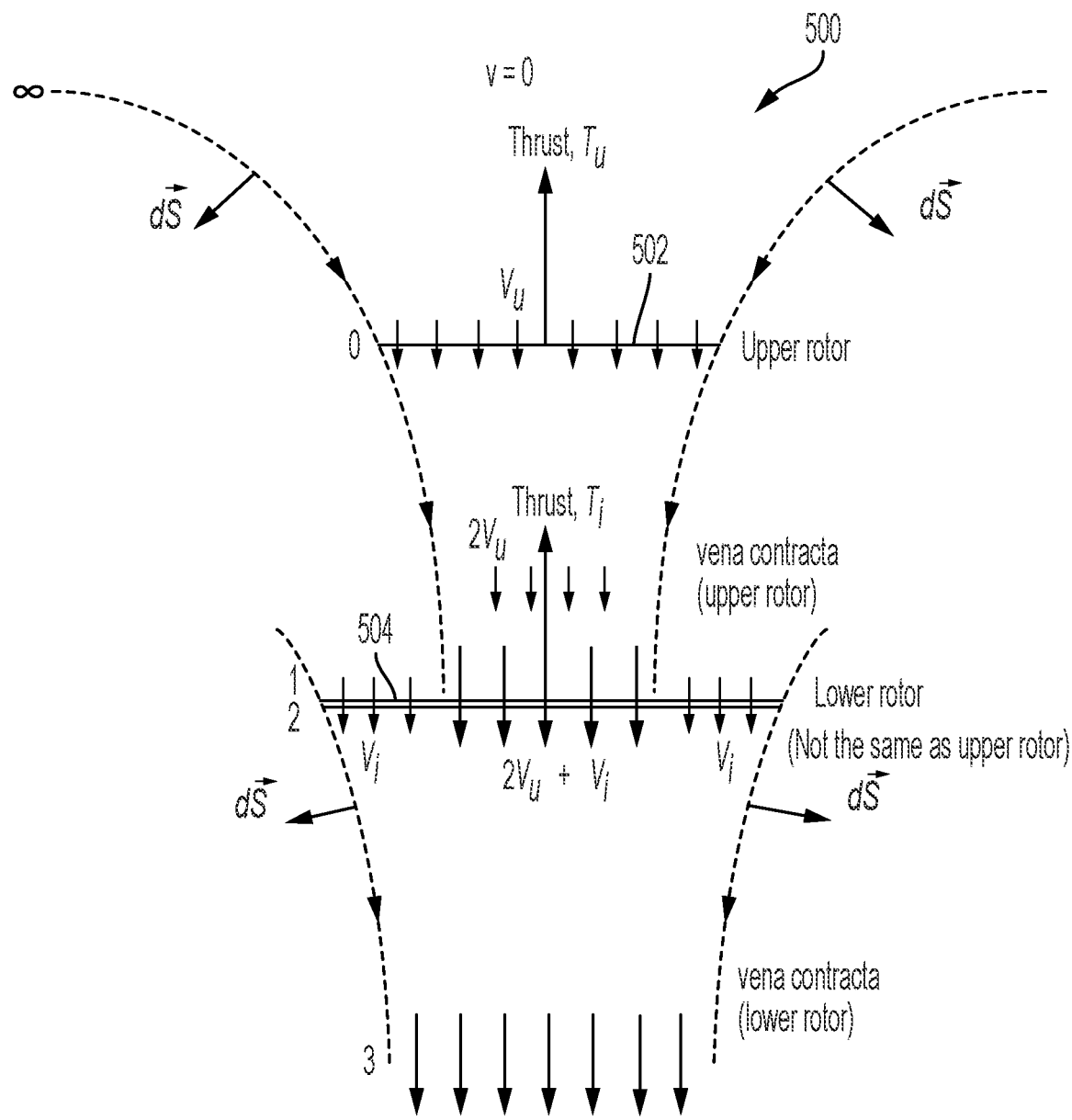
FIG. 5 shows a schematic representation of a coaxial rotor system modeled with a pair of dissimilar rotors according to various embodiments.

FIG. 5 shows a coaxial rotor system 500 modeled with a pair of dissimilar rotors 502, 504. FIG. 5 is used as a graphical example for describing the following method and it is understood that the method is not limited by FIG. 5.

According to various embodiments, the set of parameters of the method may include the following ratios:

Ratio of upper to lower rotor disc areas, $$k_A = \frac{A_u}{A_l} \quad (5)$$

Ratio of upper to lower rotor tip speeds, $$k_{V_T} = \frac{V_{T_u}}{V_{T_l}} \quad (6)$$

According to various embodiments, by applying the conservation of mass, momentum and energy, the induced power of the upper rotor may be derived according to the following:

Mass flow rate, i.e. the flow of mass through the upper rotor, may be given by:

$$\dot{m}_u = \rho A_u v_u \quad (7)$$

Accordingly, the momentum flux exiting the upper rotor may be given by:

$$(\rho A_u v_u) \cdot 2 v_u = 2\rho A_u v_u^2 \quad (8)$$

Since the momentum flux exiting the upper rotor may also be equal to the thrust $T_u$ of the upper rotor. Therefore, the thrust of the upper rotor may be expressed as:

$$T_u = 2\rho A_u v_u^2 \quad (9)$$

Accordingly, the induced power $P_u$ of the upper rotor may be given by:

$$P_u = T_u v_u = 2\rho A_u v_u^3 \quad (10)$$

According to various embodiments, by applying the conservation of mass, momentum and energy, the induced power of the lower rotor may be derived according to the following:

The mass flow through the lower rotor may have two contributions:

Mass flow due to the induced velocity $v_l (=\rho A_l v_l)$

Mass flow passed into the lower rotor from the upper rotor $(=\rho A_u v_u)$

Total mass flow through the lower rotor may thus be $$\dot{m}_l = \rho(A_u v_u + A_l v_l) \quad (11)$$

Conservation of momentum may be applied to the lower rotor. The physical statement may be that (Thrust=Momentum flux downstream−Momentum flux upstream). The resulting equation for the thrust Ti of the lower rotor may be $$T_l = \dot{m}_l w_l - 2\rho A_u v_u^2 \quad (12)$$
$$= \rho(A_u v_u + A_l v_l) w_l - 2\rho A_u v_u^2$$

Expressing the equation for the thrust Ti in terms of $k_A$ (ratio of upper to lower rotor disc areas), $$T_l = \rho A_l (k_A v_u + v_l) w_l - 2\rho A_u v_u \quad (13)$$

The lower rotor includes two regions. The first may be the inner region which lies in the fully developed slipstream of the upper rotor. The area of this region may be given by:

$$A_{l_i} = \frac{1}{2} A_u$$

The second may be the outer region which may be unaffected by the upper rotor. The area of this region may be given by:

$$A_{l_o} = A_l - \frac{1}{2} A_u$$

To determine the induced power of the lower rotor, the individual powers for each of the inner and outer parts may be determined and then summed up.

The induced power of the inner part of the lower rotor, where thrust=$T_{l_i}$, may be given by:

$$P_{l_i} = T_{l_i}(2 v_u + v_l) \quad (14)$$

where the $2v_u$ term is the contribution from the upper rotor. In order to express $P_{l_i}$ in terms of area ratio $k_A$ and total lower rotor thrust $T_l$, thrust may be assumed to be weighted by area. This results in $$T_{l_i} = \frac{A_{l_i}}{A_l} T_l \qquad (15)$$
$$= \frac{\frac{1}{2} A_u}{A_l} T_l$$
$$= \frac{1}{2} k_A T_l$$

Substituting back into Eq. (14), $$P_{l_i} = \frac{1}{2} k_A (2v_u + v_l) T_l \qquad (16)$$

The induced power of the outer part of the lower rotor, where thrust=$T_{l_o}$, may be given by:

$$P_{l_o} = T_{l_o} v_l \qquad (17)$$

In order to express $P_{l_o}$ in terms of area ratio $k_A$ and total lower rotor thrust $T_l$, thrust may again be assumed to be weighted by area. This results in $$T_{l_o} = \frac{A_{l_o}}{A_l} T_l \qquad (18)$$
$$= \frac{1}{A_l} \left( A_l - \frac{1}{2} A_u \right) T_l$$
$$= \left( 1 - \frac{1}{2} k_A \right) T_l$$

Substituting back into Eq. (17), $$P_{l_o} = \left( 1 - \frac{1}{2} k_A \right) T_l v_l \qquad (19)$$

Summing the contributions of the inner and outer regions, the total induced power of the lower rotor may be given by:

$$P_l = P_{l_i} + P_{l_o}$$

Accordingly, by substituting from Eqs. (16) and (19), and re-arranging, $$P_l = T_l (k_A v_u + v_l) \qquad (20)$$

$P_l$ may also be given by the change in kinetic energy from upstream of the lower rotor to far downstream:

$$P_l = \frac{1}{2} \rho (A_u v_u + A_l v_l) w_l^2 - P_u \qquad (21)$$

According to various embodiments, torque balance condition may be expressed according to the following:
From Power=Torque×Rotational Speed, the ratio of upper to lower rotor powers may be given by:

$$\frac{P_l}{P_u} = \frac{\tau_l \Omega_l}{\tau_u \Omega_u} \qquad (22)$$

In the torque-balanced condition, $\tau_l = \tau_u$. Hence, the ratio of powers may become $$\frac{P_l}{P_u} = \frac{\Omega_l}{\Omega_u} \qquad (23)$$

Substituting using $k_A$ and $k_{V_T}$ results in the following condition for torque balance:

$$P_l = \frac{\sqrt{k_A}}{k_{V_T}} P_u \qquad (24)$$

Substituting from Eqs. (10) and (20), the condition for torque balance may be expressed as $$T_l (k_A v_u + v_l) = \frac{\sqrt{k_A}}{k_{V_T}} T_u v_u \qquad (25)$$

According to various embodiments, a cubic equation which relates to the induced velocities through the upper and lower rotors, $v_u$ and $v_l$ respectively, may be developed according to the following:
Multiplying Eq. (13) by $v_u (k_A v_u + v_l)$ and re-arranging, $$P_l \left[ \left( 1 + k_{V_T} \sqrt{k_A} \right) v_u + \frac{k_{V_T}}{\sqrt{k_A}} v_l \right] = \rho A_l (k_A v_u + v_l)^2 \cdot (v_u w_l) \qquad (26)$$

Substituting the torque balance Eq. (24) into the kinetic energy equation for $P_l$ (Eq. (21)) and re-arranging, $$P_l \left( 1 + \frac{k_{V_T}}{\sqrt{k_A}} \right) = \frac{1}{2} \rho A_l (k_A v_u + v_l) w_l^2 \qquad (27)$$

Eq. (27) divided by Eq. (26), and re-arranging, $$w_l = 2 \left( 1 + \frac{k_{V_T}}{\sqrt{k_A}} \right) v_u \frac{k_A v_u + v_l}{\left[ \left( 1 + k_{V_T} \sqrt{k_A} \right) v_u + \frac{k_{V_T}}{\sqrt{k_A}} v_l \right]} \qquad (28)$$

Substituting the kinetic energy forms for power, Eqs. (10) and (21), into the torque balance Eq. (24), $$\frac{1}{2} \rho (A_u v_u + A_l v_l) w_l^2 - 2\rho A_u v_u^3 = \frac{\sqrt{k_A}}{k_{V_T}} 2\rho A_u v_u^3 \qquad (29)$$

After re-arranging, $$\left( \frac{\sqrt{k_A}}{k_{V_T}} + 1 \right) v_u^3 = \frac{w_l^2}{4 k_A} (k_A v_u + v_l) \qquad (30)$$

Substituting Eq. (28) for $w_l$ into Eq. (30), and after considerable re-arrangement, a cubic equation in the induced velocities $v_u$ and $v_l$ may be obtained as follows:

$$\frac{1}{k_A}\left(1+\frac{k_{V_T}}{\sqrt{k_A}}\right)^2 v_l^3 + \left[3\left(1+\frac{k_{V_T}}{\sqrt{k_A}}\right)^2 - \left(\frac{\sqrt{k_A}}{k_{V_T}}+1\right)\frac{k_{V_T}^2}{k_A}\right]v_u v_l^2 + \quad (31)$$

$$\left[3k_A\left(1+\frac{k_{V_T}}{\sqrt{k_A}}\right)^2 - 2\left(\frac{\sqrt{k_A}}{k_{V_T}}+1\right)(1+k_{V_T}\sqrt{k_A})\frac{k_{V_T}}{\sqrt{k_A}}\right]v_u^2 v_l +$$

$$\left[\left(1+\frac{k_{V_T}}{\sqrt{k_A}}\right)^2 k_A^2 - \left(\frac{\sqrt{k_A}}{k_{V_T}}+1\right)(1+k_{V_T}\sqrt{k_A})^2\right]v_u^3 = 0$$

According to various embodiments, the cubic equation (31) may be verified according to the following:

The cubic equation (31) which relates the induced velocities through the upper and lower rotors, $v_u$ and $v_l$ respectively, may be verified by inserting $k_A=1$ and $k_{V_T}=1$ (i.e. the upper and lower rotors diameters are equal, and the upper and lower rotors tip speeds are equal). This results in $$2v_l^3 + 5v_u v_l^2 + 2v_u^2 v_l - 2v_u^3 = 0$$

This is exactly the expected result, as this is the cubic equation of the baseline coaxial momentum theory discussed above.

According to various embodiments, an equation for the power per unit thrust of the coaxial system may be determined from the ratio of upper to lower rotor thrusts based on torque balance condition according to the following:

In general, for a given set of $k_A$, $k_{V_T}$ and either of $v_u$ or $v_l$, the cubic equation may be solved for the other induced velocity.

The specified induced velocity may be determined from the selection of disc loading, which is usually decided upon during the initial stages of the conceptualizing of the coaxial rotor system. In the present example, the selected disc loading may be for the upper rotor, denoted by $(DL)_u$. The specified induced velocity of the upper rotor may thus be determined from $$v_u = \sqrt{\frac{(DL)_u}{2\rho}} \quad (32)$$

The cubic equation (31) may now be solved for the induced velocity of the lower rotor $v_l$.

The ratio of lower to upper rotor induced velocities may be denoted as $k_v$ $$k_v \equiv \frac{v_l}{v_u} \quad (33)$$

From torque balance, Eq. (25), which is reproduced as follows:

$$T_l(k_A v_u + v_l) = \frac{\sqrt{k_A}}{k_{V_T}} T_u v_u$$

The ratio of upper to lower rotor thrusts, $k_T$, may be determined as $$k_T \equiv \frac{T_u}{T_l} = \frac{k_{V_T}}{\sqrt{k_A}}(k_A + k_v) \quad (34)$$

The upper rotor thrust, as a fraction of the total coaxial system thrust, may thus be $$k_{Ttot} \equiv \frac{T_u}{T_{tot}} = \frac{k_T}{k_T + 1} \quad (35)$$

The total coaxial system induced power may be given by:

$$P_{tot} = P_u + P_l \quad (36)$$

Substituting the torque balance Eq. (24) for $P_l$, $$P_{tot} = \left(1 + \frac{\sqrt{k_A}}{k_{V_T}}\right) P_u \quad (37)$$

Knowing that $P_u = T_u v_u$, and substituting Eqs. (35) and (32), the power per unit thrust of the coaxial rotor system may be determined as follows:

$$\frac{P_{tot}}{T_{tot}} = \left(1 + \frac{\sqrt{k_A}}{k_{V_T}}\right) \cdot k_{Ttot} \cdot \sqrt{\frac{(DL)_u}{2\rho}} \quad (38)$$

It should be noted that the Eq. (38) for $P_{tot}/T_{tot}$ is a function of three independent variables $k_A$, $k_{V_T}$ and $(DL)_u$. These three variables will be the variables in the optimization to be described below, which seeks to minimize $P_{tot}/T_{tot}$, a condition which represents best hovering efficiency.

According to various embodiments, the power per unit thrust of the coaxial rotor system may be optimized according to the following:

The objective of the optimization is to determine the combination of area ratio $k_A$, tip speed ratio $k_{V_T}$ and upper rotor disc loading $(DL)_u$ which maximizes the hovering efficiency (achieved by minimizing the power per unit thrust $P_{tot}/T_{tot}$) as determined by the generalized momentum theory representation of coaxial rotor systems.

The optimization may be subjected to fulfilling two additional operational requirements:

Specified amount of thrust to be generated within a specified geometric footprint Assuming the coaxial rotor system is one of a number of coaxial pairs in a multi-rotor VTOL UAV, safety requirements for recovery from failure of one of the two motors in a coaxial pair. In this scenario, it is desirable for total thrust to be equally distributed between the upper and lower rotors These operational requirements may be quantified as:

Specified $T_{tot,spec}$ (i.e. desired total thrust)

The footprint is specified through the disc area of the lower rotor, $A_{l,spec}$ (i.e. maximum rotor diameter)

Specified $k_{Ttot,spec}=0.5$ (i.e. desired thrust ratio of upper rotor and lower rotor)

Optimization with the quantified operational requirements may be solved by the method of calculus of variations using Lagrange multipliers. Two constraint equations may be defined. The first is in relation to the specified thrust and footprint. The second is in relation to the specified $k_{Ttot,spec}$.

By definition of disc loading, $$(DL)_u = \frac{T_u}{A_u} \quad (39)$$

-continued $$= \frac{k_{Ttot}T_{tot,spec}}{k_A A_{l,spec}}$$

Hence, the first constraint equation may be given by:

$$(DL)_u - \frac{k_{Ttot}T_{tot,spec}}{k_A A_{l,spec}} = 0 \quad (40)$$

The above Eq. (40) may be denoted in terms of a function $f_1$.

$$f_1\lfloor (DL)_u, k_A, k_{V_T} \rfloor = 0 \quad (41)$$

From the specified thrust ratio, $$k_{Ttot} = k_{Ttot,spec} \quad (42)$$

Hence, the second constraint equation may be given by:

$$k_{Ttot} - k_{Ttot,spec} = 0 \quad (43)$$

The above Eq. (43) may be denoted in terms of a function $f_2$.

$$f_2\lfloor (DL)_u, k_A, k_{V_T} \rfloor = 0 \quad (44)$$

An auxiliary function H may now be set up as $$H = \frac{P_{tot}}{T_{tot}} + \lambda_1 f_1 + \lambda_2 f_2 \quad (45)$$

where $\lambda_2$ and $\lambda_2$ are the Lagrange multipliers.

There may thus be 5 independent nonlinear equations to be solved for 5 variables: $k_A$, $k_{V_T}$, $(DL)_u$, $\lambda_1$ and $\lambda_2$. The 5 equations are:

$$\frac{\partial H}{\partial k_A} = 0 \quad (46)$$

$$\frac{\partial H}{\partial k_{V_T}} = 0 \quad (47)$$

$$\frac{\partial H}{\partial (DL)_u} = 0 \quad (48)$$

$$f_1\lfloor (DL)_u, k_A, k_{V_T} \rfloor = 0 \quad (49)$$

$$f_2\lfloor (DL)_u, k_A, k_{V_T} \rfloor = 0 \quad (50)$$

The equations may be coded and solved numerically in MATLAB. The equation solver may also be developed in MATLAB, and may include
- Genetic Algorithm (GA) technique for initial exploration of the design space, leading to the vicinity of the optimum point; or
- Newton-Raphson technique, initialized using the vicinity point determined by GA, for final convergence, as it is well-known that this technique has very good convergence properties.

An application example for the method of generating a set of values for respective ones of a set of parameters used in determining rotor blade profiles for a coaxial rotor system according to various embodiments is described in the following.

According to an application example, the specified inputs for the application example are as follows:

The aircraft type is a VTOL UAV which uses three coaxial rotor pairs, similar to the UAV 200 shown in FIG. 2;
MTOW=5 kg;
Footprint for each coaxial pair is defined by a maximum diameter of 25.4 in (0.645 m);
Disc loading is in the region of 25 N/m$^2$; and
Thrust balance is required.

The specified inputs are used with the method as described herein to determine the ratios of rotor disc areas $k_A$ and tip speeds $k_{V_T}$ of the upper and lower rotors of a coaxial pair that minimizes power to produce the design thrust of 16.35 N (=MTOW/3) at static hover, subject to torque balance condition.

Figure 6:
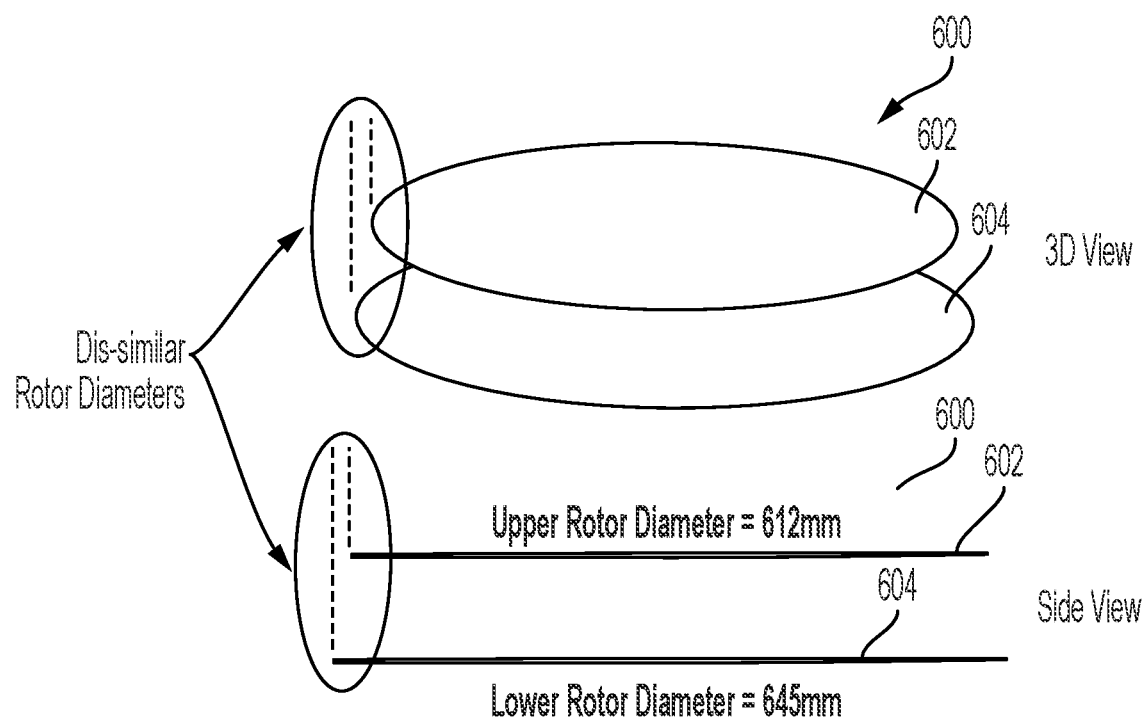
FIG. 6 shows a schematic diagram of rotor disc planes of a coaxial rotor system according to the example application.

According to the application example, with optimization with Lagrange multipliers, the following results are determined:
Disc loading of the upper rotor $(DL)_u$=27.837 N/m$^2$
Ratio of upper to lower rotor disc areas $k_A$=0.8988
Ratio of upper to lower rotor tip speeds $k_{V_T}$=0.6494
Ideal total induced power of the coaxial pair=70.4 W
With these results, the rotor diameters can be determined as:
Upper rotor: 24.1 in (0.612 m)
Lower rotor: 25.4 in (0.645 m)
Assuming a tip Mach number of 0.15 for the lower rotor, the shaft rotational speeds can be determined as:
Upper rotor: 1593 rpm
Lower rotor: 2325 rpm FIG. 6 shows a schematic diagram of rotor disc planes of a coaxial rotor system 600 according to the example application. As shown, the upper 602 and lower 604 rotors have dissimilar rotor diameters. In particular, the diameter of the lower rotor 602 is shown to be larger than the diameter of the upper rotor 602. The lower rotor 602 has a dimension of 645 mm and the upper rotor has a diameter of 612 mm. In this particular configuration and dimensions, the upper rotor 602 and the lower rotor 604 will operate such that the ratio of the thrusts of the upper rotor 602 and the lower rotor 604 is 1:1, which is the desired thrusts distribution.

Figure 7:
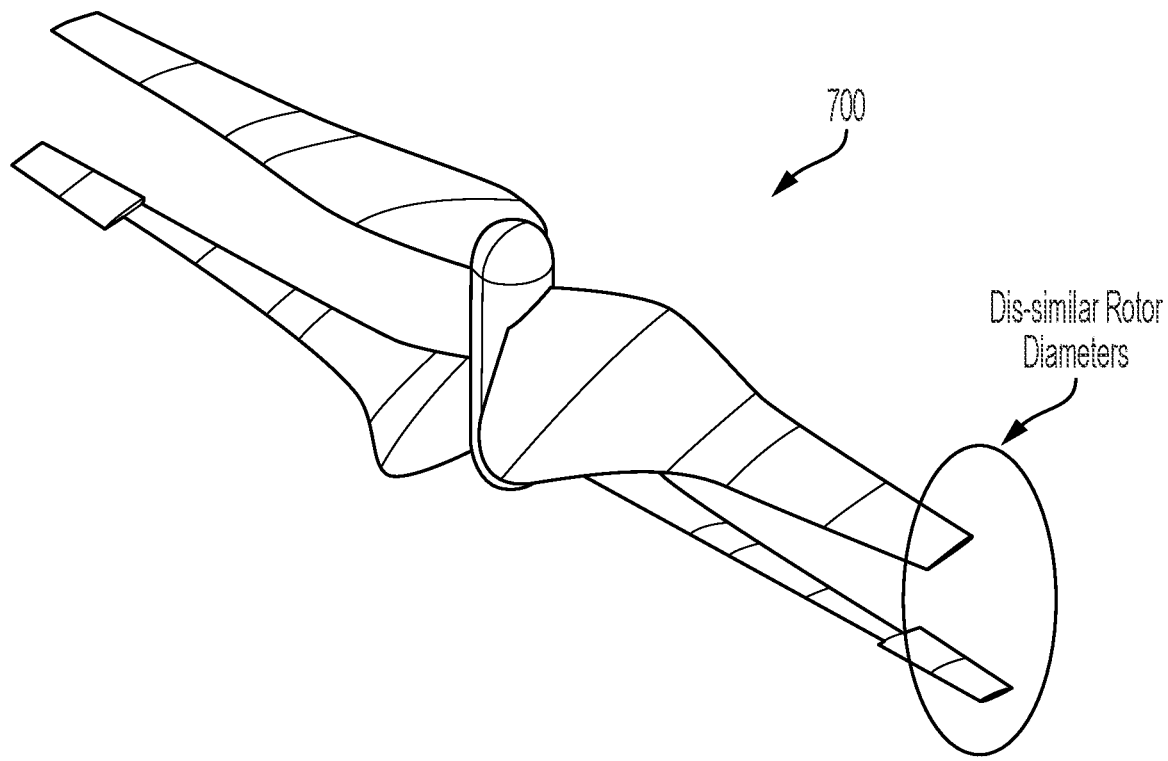
FIG. 7 shows a drawing of a rotor blade profile developed for the coaxial rotor system of FIG. 6.
Figure 8:
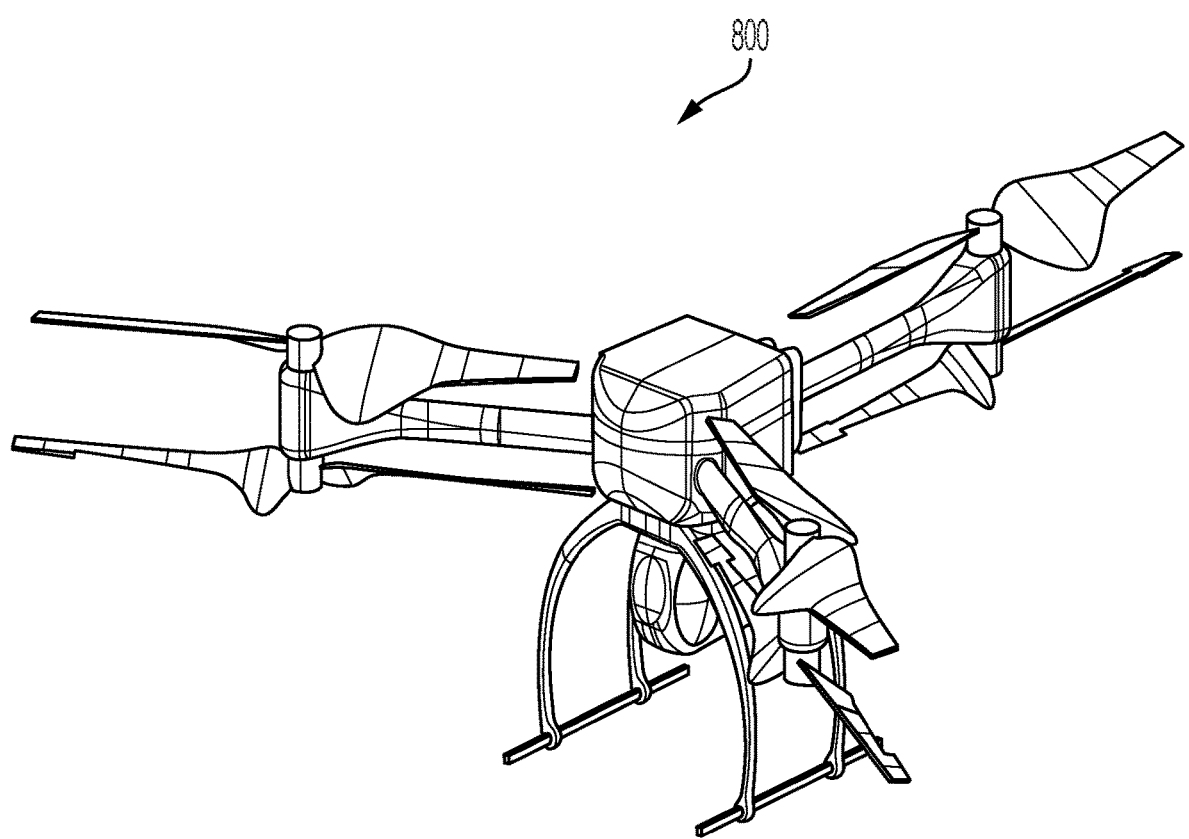
FIG. 8 shows a drawing of an unmanned aerial vehicle with the rotor blade profile shown in FIG. 7.

According to various embodiments, the results obtained from the method as described herein may be used as inputs for the next level of development, which is to develop the rotor blade profile for the coaxial rotor. For example, the dissimilar rotor diameters and the dissimilar rotational speeds obtained in the application example above may be used as inputs for aerodynamic optimization to obtain the geometries of the rotor blade profile. This may be done using the Blade Element Momentum Theory (BEMT) technique. FIG. 7 shows a result of the rotor blade profile 700 developed for the coaxial rotor system of FIG. 6. As shown, the chord distribution, the twist distribution, the pitch angle distribution, and the airfoil distribution etc. for the rotor blade profile have been developed. FIG. 8 shows a VTOL UAV 800 with the rotor blade profile shown in FIG. 7.

Embodiments have provided a rational and logical method to generate configurations and/or dimensions and/or operating parameters for a coaxial rotor system from a desired performance and/or efficiency and/or operational requirements required for the coaxial rotor system. Essentially, this is a marked improvement over the current state of the art in which there do not appear to have been any reported use of desired performance and/or efficiency and/or operational requirements (such as ratio of thrusts) as the basis for determination of the configurations and/or dimensions and/or operating parameters (such as rotor diameters, rotational speeds, tip speeds etc.) for the coaxial rotor system.

Embodiments of the method may enable greater versatility in exploiting additional degrees of freedom to fulfill a wide range of operational requirements in which the rotor diameters, the rotational speeds and tip speeds etc. are variables to be determined from the method, while performance or efficiency or operating parameters in terms of ratio of thrusts etc. may now be used as an input.

As shown in the example application, embodiments may determine the ratios of diameters and rotational speeds from equal thrust distribution, while fulfilling the torque balance condition and being optimized for maximum hovering efficiency. This application is representative of using performance or efficiency or operational requirements as the starting point for engineering coaxial rotor systems.

Embodiments may allow determining the optimum combination of rotor diameters, rotational speeds and tip speeds, while simultaneously maintaining both thrust and torque balance.

The values obtained from the method according to various embodiments may be used as inputs for subsequent technique to obtain the rotor blade profiles, for example inputting the values as the parameters in Blade Element Momentum Theory (BEMT) to define the geometries of the upper and lower rotor blades profiles.

Some portions of the description are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a general purpose computer or other device selectively activated or reconfigured by a computer program stored in the computer. The algorithms and displays presented herein are not inherently related to any particular computer or other apparatus. Various general purpose machines may be used with programs in accordance with the teachings herein. Alternatively, the construction of more specialized apparatus to perform the required method steps may be appropriate.

In addition, the present specification also implicitly discloses a computer program or software/functional module, in that it would be apparent to the person skilled in the art that the individual steps of the methods described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a general purpose computer. The computer program when loaded and executed on such a general-purpose computer effectively results in an apparatus that implements the steps of the methods described herein.

The software or functional modules described herein may also be implemented as hardware modules. More particularly, in the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the system can also be implemented as a combination of hardware and software modules.

Figure 9A:
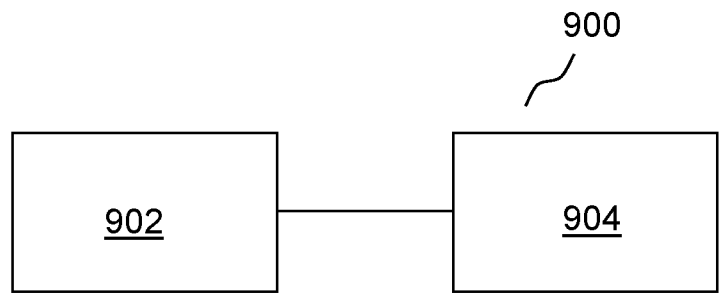
FIGS. 9A and 9B show schematic block diagrams illustrating systems for generating a set of values for respective ones of a set of parameters used in determining rotor blade profiles for a coaxial rotor system according to various embodiments.
Figure 9B:
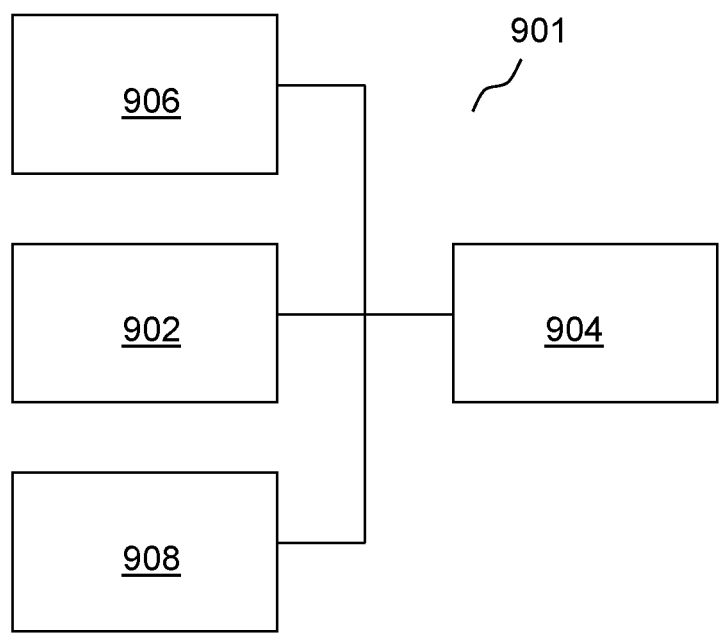

FIGS. 9A and 9B show schematic block diagrams for illustrating systems for generating a set of values for respective ones of a set of parameters used in determining rotor blade profiles for a coaxial rotor system according to various embodiments. In FIG. 9A, a system 900 for generating a set of values for respective ones of a set of parameters used in determining rotor blade profiles for a coaxial rotor system may include means 902 for establishing a ratio of respective desired thrusts of an upper rotor and a lower rotor of the coaxial rotor system based on a desired performance of the coaxial rotor system, and means 904 for determining the set of values of the set of parameters from the desired thrusts ratio based on a torque balance condition between the upper rotor and the lower rotor of the coaxial rotor system.

In FIG. 9B, a system 901 for generating a set of values for respective ones of a set of parameters used in determining rotor blade profiles for a coaxial rotor system may, similar to the system 900 of FIG. 9B, include means 902 for establishing a ratio of respective desired thrusts of an upper rotor and a lower rotor of the coaxial rotor system based on a desired performance of the coaxial rotor system, and means 904 for determining the set of values of the set of parameters from the desired thrusts ratio based on a torque balance condition between the upper rotor and the lower rotor of the coaxial rotor system.

According to various embodiments, the system 901 of FIG. 9B may further include means 906 for establishing a maximum rotor diameter for the coaxial rotor system. In this embodiment, the means 904 for determining the set of values for the set of parameters may use the maximum rotor diameter obtained from the means 906 for establishing a maximum rotor diameter for the coaxial rotor system to determine the set of values for the set of parameters.

According to various embodiments, the system 901 of FIG. 9B may further include means 908 for establishing a desired total thrust for the coaxial rotor system. In this embodiment, the means 904 for determining the set of values for the set of parameters may use the desired total thrust obtained from the means 908 for establishing a desired total thrust for the coaxial rotor system to determine the set of values for the set of parameters.

According to various embodiments, the system 901 may include three different means 902, 906 and 908 for establishing desired thrusts ratio, maximum rotor diameter and desired total thrust respectively as shown in FIG. 9B. According to various embodiments, it may be possible for a system for generating a set of values for respective ones of a set of parameters used in determining rotor blade profiles for a coaxial rotor system to include any combination of the means 902, 906 and 908. Further, it may also be possible that a system for generating a set of values for respective ones of a set of parameters used in determining rotor blade profiles for a coaxial rotor system may include means 902 which may establish desired thrusts ratio, maximum rotor diameter and/or desired total thrust.

According to various embodiments, the means 904 for determining the set of values for the set of parameters may optimize the set of values based on a maximum hovering efficiency.

According to various embodiments, the set of parameters may include a ratio of respective rotor disc areas of the upper rotor and the lower rotor of the coaxial rotors.

According to various embodiments, the set of parameters may include upper rotor diameter and lower rotor diameter.

According to various embodiments, the set of parameters may include a ratio of respective rotor tip speeds of the upper rotor and the lower rotor of the coaxial rotors.

According to various embodiments, the set of parameters may include shaft rotational speeds of the upper rotor and the lower rotor.

According to various embodiments, the set of parameters may include a disc loading of the upper rotor.

According to various embodiments, the set of parameters may include an ideal total induced power of the coaxial rotor.

According to various embodiments, the ratio of respective desired thrusts of an upper rotor and a lower rotor of the coaxial rotor may be 1:1.

While the invention has been particularly shown and described with reference to specific embodiments, it should be understood by those skilled in the art that various changes in form and detail may be made therein without departing from the scope of the invention as defined by the appended claims. The scope of the invention is thus indicated by the appended claims and all changes which come within the meaning and range of equivalency of the claims are therefore intended to be embraced.

The invention claimed is:

1. A method of generating a set of values for respective ones of a set of parameters used in determining rotor blade profiles for a coaxial rotor system, the method comprising:
    establishing a ratio of respective desired thrusts of an upper rotor and a lower rotor of the coaxial rotor system based on a desired performance of the coaxial rotor system; and
    determining the set of values of the set of parameters from the desired thrusts ratio based on a torque balance condition between the upper rotor and the lower rotor of the coaxial rotor system.

2. The method of claim 1, further comprising establishing a maximum rotor diameter for the coaxial rotor system prior to determining the set of values for the set of parameters, and wherein determining the set of values for the set of parameters comprises using the maximum rotor diameter.

3. The method of claim 1, further comprising establishing a desired total thrust for the coaxial rotor system prior to determining the set of values for the set of parameters, and wherein determining the set of values for the set of parameters comprises using the desired total thrust.

4. The method of claim 1, wherein determining the set of values for the set of parameters further comprises optimizing the set of values based on a maximum hovering efficiency.

5. The method of claim 1, wherein the set of parameters include a ratio of respective rotor disc areas of the upper rotor and the lower rotor of the coaxial rotor system.

6. The method of claim 5, wherein the set of parameters include upper rotor diameter and lower rotor diameter.

7. The method of claim 1, wherein the set of parameters include a ratio of respective rotor tip speeds of the upper rotor and the lower rotor of the coaxial rotor system.

8. The method of claim 7, wherein the set of parameters include shaft rotational speeds of the upper rotor and the lower rotor.

9. The method of claim 1, wherein the set of parameters include a disc loading of the upper rotor.

10. The method of claim 1, wherein the set of parameters include an ideal total induced power of the coaxial rotor system.

11. The method of claim 1, wherein the ratio of respective desired thrusts of the upper rotor and the lower rotor of the coaxial rotor system is 1:1.

12. A system for generating a set of values for respective ones of a set of parameters used in determining rotor blade profiles for a coaxial rotor system, the system comprising:
    means for establishing a ratio of respective desired thrusts of an upper rotor and a lower rotor of the coaxial rotor system based on a desired performance of the coaxial rotor system; and
    means for determining the set of values of the set of parameters from the desired thrusts ratio based on a torque balance condition between the upper rotor and the lower rotor of the coaxial rotor system.

13. The system of claim 12, further comprising means for establishing a maximum rotor diameter for the coaxial rotor system, and wherein the means for determining the set of values for the set of parameters uses the maximum rotor diameter to determine the set of values for the set of parameters.

14. The system of claim 12, further comprising means for establishing a desired total thrust for the coaxial rotor system, and wherein the means for determining the set of values for the set of parameters uses the desired total thrust to determine the set of values for the set of parameters.

15. The system of claim 12, wherein the means for determining the set of values for the set of parameters optimizes the set of values based on a maximum hovering efficiency.

16. The system of claim 12, wherein the set of parameters include a ratio of respective rotor disc areas of the upper rotor and the lower rotor of the coaxial rotor system, and wherein the set of parameters include upper rotor diameter and lower rotor diameter.

17. The system of claim 12, wherein the set of parameters include a ratio of respective rotor tip speeds of the upper rotor and the lower rotor of the coaxial rotor system, and wherein the set of parameters include shaft rotational speeds of the upper rotor and the lower rotor.

18. The system of claim 12, wherein the set of parameters include a disc loading of the upper rotor.

19. The system of claim 12, wherein the set of parameters include an ideal total induced power of the coaxial rotor system.

20. The system of claim 12, wherein the ratio of respective desired thrusts of the upper rotor and the lower rotor of the coaxial rotor system is 1:1.

* * * * *